Patented Dec. 16, 1930

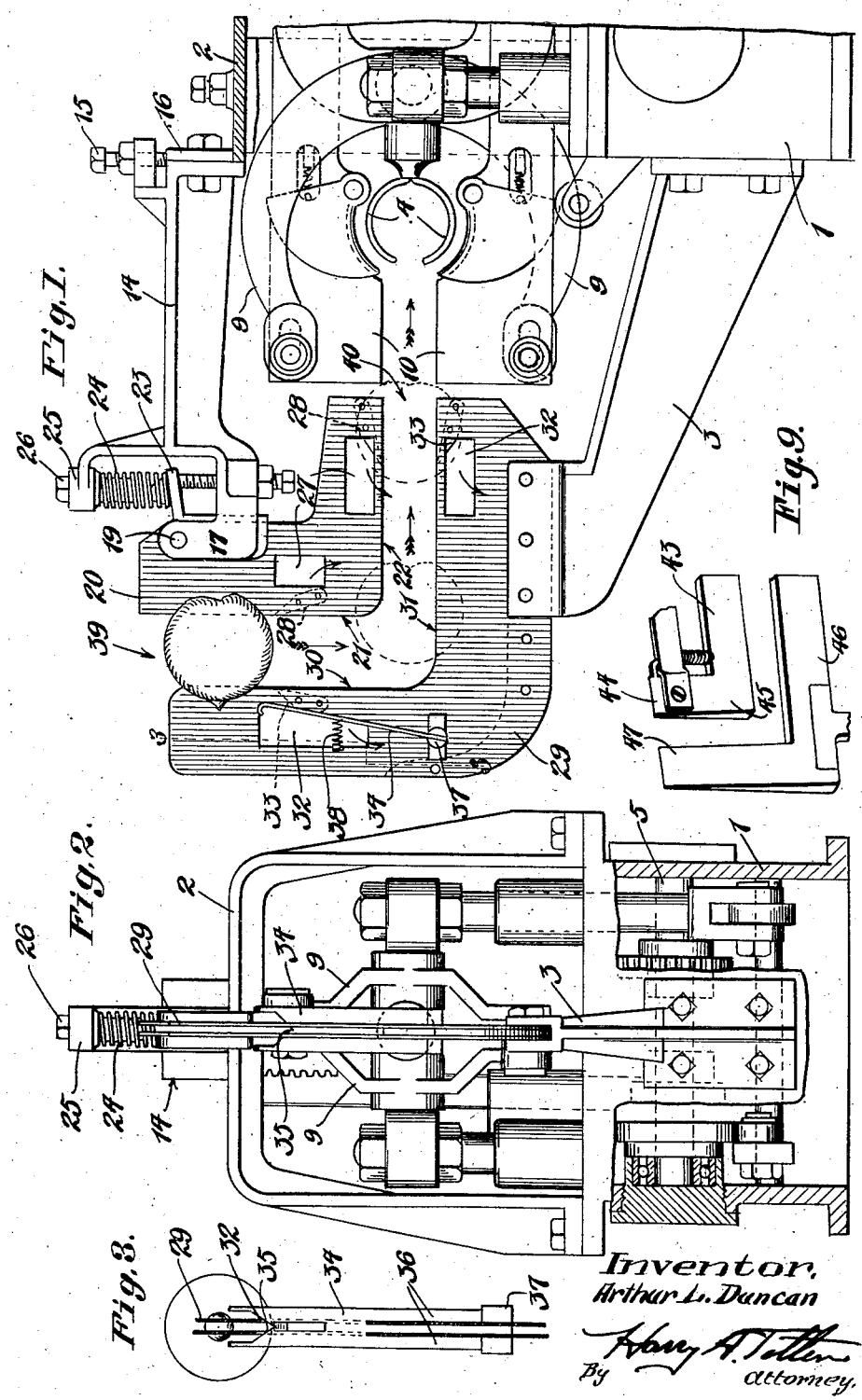

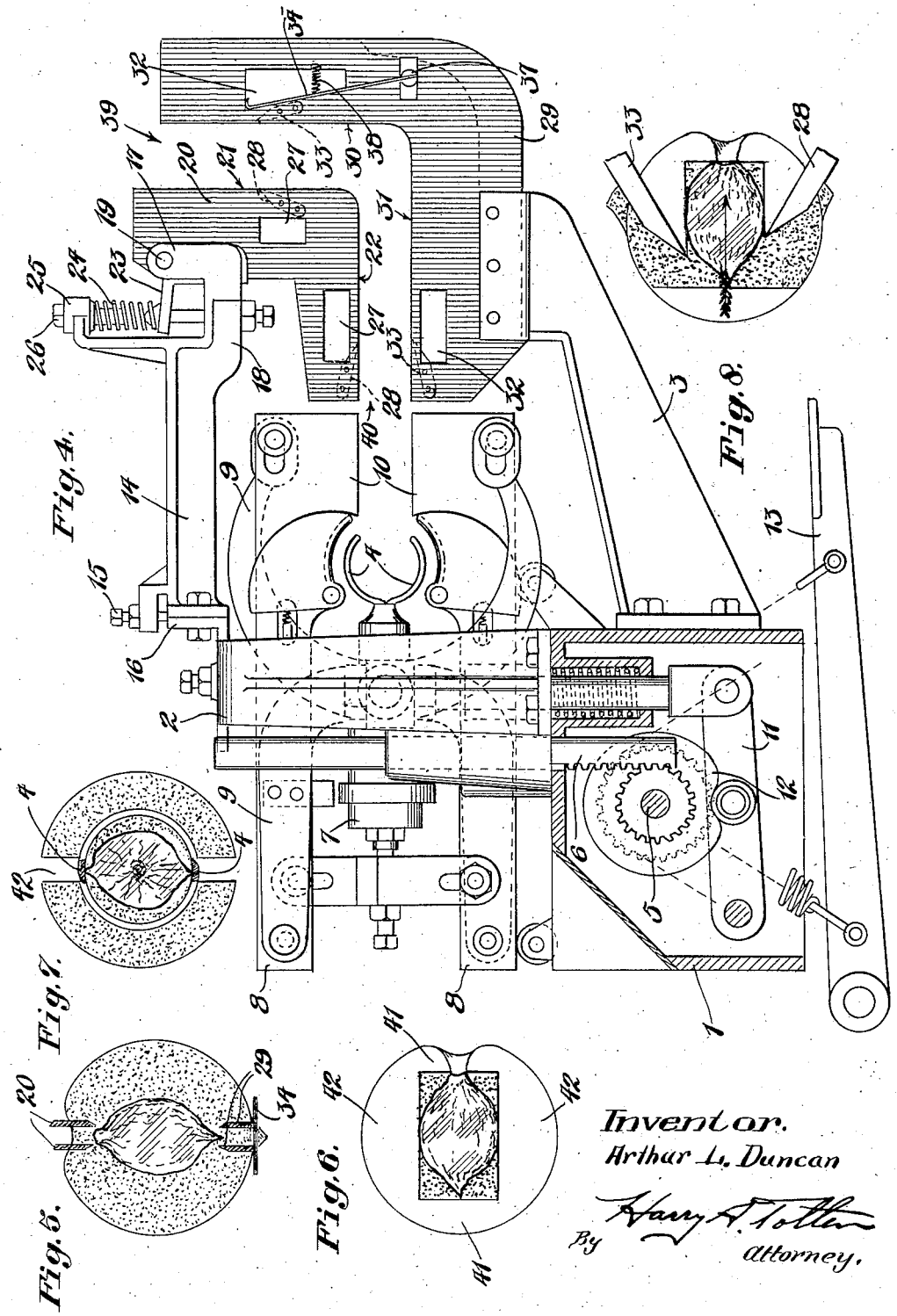

1,785,000

UNITED STATES PATENT OFFICE

ARTHUR L. DUNCAN, OF OAKLAND, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

APPARATUS FOR FEEDING, TRIMMING, AND CUTTING FRUIT PREPARATORY TO REMOVING THE PIT THEREFROM

Application filed October 7, 1925. Serial No. 60,973.

This invention relates to slice attachments for pit-removing machines used in pitting single-stone fruit.

In the canning industry it has been heretofore customary in removing the pits from fruit of the single-stone variety, and particularly peaches, to cut a circumferential slice from the fruit to the approximate depth of the stone, by a knife or hand tool designed for the purpose or by a special slice mechanism separate from the pitting machine subsequently used for separating the pit from the two half portions of fruit adhering to the pit after the formation of the slice. These methods of providing a slice in the fruit occasion a large amount of unnecessary labor and loss of time, which this invention is designed to overcome, in addition to increasing the simiplicity of the slice-forming mechanism and placing it in an associated relation with the pitting mechanism.

It is therefore an object of this invention to provide a pitting machine with a simple form of attachment adapted to form a guideway to fruit to be pitted by the pitting knives, and during the passage of the fruit through this guideway the slice is formed providing the recess for receiving the pitting knives in such a manner that the fruit is delivered with a slice formed therein, directly from this slice attachment to these pitting knives in operative position ready for the pitting operation.

Another object of this invention resides in providing a combination of a pitting mechanism and a slicing mechanism associated with said pitting mechanism to form a guideway thereto for severing a circumferential slice from the fruit in being moved through the guideway for direct delivery in predetermined relation to said pitting mechanism.

A further object of the invention is to provide a slicing mechanism for association with a pitting machine wherein the guideway is of such a construction that the fruit is moved in angular relation in one part of the guideway therein with respect to its movement in another part of said guideway, so that different portions of the slice are removed from the fruit in each angular ranged portion of said mechanism, in order to provide the recess for receiving the pitting knives.

The invention comprehends numerous other objects residing in the combination of the slicing mechanism with the pitting machine as well as in the specific construction and relation of the parts of the slicing mechanism, which are all more specifically described in the following detailed description and in the claims directed to a preferred form of the invention, it being understood, however, that various changes in the size, shape, and relation of the parts, other than those illustrated, may be made without departing from the spirit and scope of the invention as herein set forth.

In the drawings forming a part of this application.

Fig. 1 illustrates a side elevation of the slicing mechanism applied to a pitting machine, portions of said machine being omitted.

Fig. 2 is a front elevation of the machine showing the slice mechanism applied thereto, portions being shown in section.

Fig. 3 is a sectional view taken on line 3—3 of Fig. 1.

Fig. 4 is a side elevation, with portions broken away and shown in section, of the opposite side of the pitting machine from that shown in Fig. 1, with the slice attachment thereon.

Fig. 5 shows the manner in which the slicing mechanism operates during the movement of fruit through the guideway to remove the slice from the body portion thereof.

Fig. 6 shows a sectional view taken through a fruit from which the slice has been removed ready for delivery to the pitting mechanism.

Fig. 7 is a sectional view through a fruit formed with a slice, which view is taken at right angles to Fig. 6, and which in addition shows the cycle of movement of the pitting knives.

Fig. 8 is a view showing the manner in which the slice ejectors operate to remove the slice from the peach to the depth of the pit.

Fig. 9 shows a perspective of the slicing blades of a slightly different form of slice mechanism from that illustrated in Fig. 1.

A base is indicated at 1, which is provided on the upper end with an inverted U-shaped member 2 and on one side thereof with a bracket 3.

On the upper end of the base is mounted a pitting mechanism which includes a pair of rotatable pitting knives 4 adapted to be rotated from the power shaft 5 through the gear connection with the bar 6 which drives the rotatable mechanism in the spindle structure 7. A pair of plate members 8 mounted one above the other in spaced relation are operably connected with the reversely curved separating bars 9 which are provided for operating the bar members 8 for normally holding the same in the spaced relation illustrated in Figures 1 and 4 and for further moving the parallel portions 10 toward each other when a fruit is fed between the bar members for the removal of the pit. The operation of these bar members is effected through mechanism controlled by the lever 11 operated by the cam 12 mounted for rotation on the shaft 5, which shaft is operated from the foot lever 13. In the removal of a pit from fruit the parallel end portions 10 move into substantially contacting relation before the operation of the pitting knives, which are drawn closely together and around the pit of the fruit through the movement of the bars 8 and the spindle mechanism 7 in the initial movement of the foot lever 13, while in the remainder of the movement of this lever the pitting knives are rotated for severing the pit from the two halves of the slicted fruit.

The above described pitting mechanism forms the subject matter of a co-pending application, Serial Number 756,175, filed December 16, 1924 and only sufficient description has been here given for an understanding of the relation of the parts of the mechanism at it is co-related with the hereinafter described structure forming the principal feature of the present invention in combination with pitting mechanism.

Upon the inverted U-shaped bracket 2 is adjustably mounted a horizontally extending arm 14 the adjustment of which is effected through the set-screw 15 cooperating with the extension 16 of the bracket member 2, so that the arm 14 may be adjusted vertically with respect to said bracket 2. The free end of this arm 14 projects above the upper free end of the arm 3 as shown in Figures 1 and 4 and has a substantially vertically extending terminal 17 on the offset end 18 thereof in which pivotally mounted at 19 a yieldable slicer unit 20 of substantially L-shape configuration providing cutting edges at 21 and 22 respectively.

This slicer unit 20 comprises a pair of spaced parallel plates to which are secured the bracket 23 with which engages a coil spring 24 the other end of which seats against an abutment 25 formed on the arm 14 and which has adjustable means indicated by the numeral 26 for varying the tension of said spring.

The yieldable slicer unit has the plates formed with discharge openings 27 in both end portions thereof adjacent the cutting edges 21 and 22 respectively, and between these discharge openings and the cutting edges as well as between the pair of plates are mounted slice removing blades 28.

A cooperating slicing unit 29 is mounted in the upper free end of the bracket member 3 and is of similar configuration to the unit 20 having cutting edges at 30 and 31 respectively for cooperation with the cutting edges 21 and 22 respectively in the formation of a slice in the fruit. The unit 29 as illustrated in Figures 1 to 4 also comprises a pair of spaced parallel plates in the same manner as the unit 20 which are formed in both angular portions thereof and in a similar position with respect to the unit 20, with discharge openings 32 for the slice severed by the knives 33 mounted between the openings and the cutting edges of the unit and between the pair of plates.

A tip removing member 34 is mounted in the upper discharge opening 32 of the unit 29 and is formed with a V-shaped cutting recess in the upper end as indicated at 34 in Figure 3 which normally lies between the plates forming the unit for severing the tip from the fruit as it is fed into the machine. The lower end of this tip-removing member is provided with a pair of spaced parallel legs 36 which are pivotally secured at 37 to the plates forming the unit 29. A coil spring 38 engaging the tip-removing member 34 and normally held under compression between said member and the opposite side of the discharge opening 32, resiliently holds the tip-removing member in its operative position.

These slicer units 20 and 29 respectively in their mounted relation as shown in Figures 1 and 4 form a guideway having an entrance at the upper end of the machine as indicated at 39 into which the fruit to be sliced is inserted while at the opposite ends it is provided with a discharge from the guideway at 40 for directing the fruit between the parallel faces 10 of the pitting machine mechanism and directly to the pitting knives 4. In the feeding of the fruit through the guideway and between these cooperating slicer members or units the cutting edges 21 and 30 sever the slice at opposite ends of the fruit and in the downward movement of the fruit in the guideway, and in the position shown in Figure 1 the tip-removing member 34 cuts the tip from the fruit and discharges it through the openings 32 while the knives 28 and 33 adjacent the entrance to the guideway remove the slice from the ends of the fruit and discharge the same through the adjacent discharge openings. Then as the fruit is moved downwardly through the guideway to the lower end it is then moved in a direction substantially at right angles through the remaining portion of the guideway to the discharge end at 40 and in the movement through this part of the guideway the cutting edges 22 and 31 sever the slice from the sides of the fruit while the knives 28 and 33 adjacent the discharge end of the guideway remove the severed slice and discharge the same through the openings 27 and 32, so that the fruit is then ready for delivery to the pitting mechanism into which it is directed from the slicing mechanism in a most efficient manner so that the operation of the foot pedal 13 will rotate the pitting knives and operate the pitting mechanism for removing the pit from the two halves of the fruit adhering to the sides of said pit in a well-known manner.

By referring particularly to Figures 5 to 8 inclusive, it will be seen in Figure 5 how the slicer units cooperate to cut the side walls of the slice to a point substantially the depth of the pit, in addition to illustrating the manner in which the tip-remover severs the tip from the fruit. In Figure 6 the slice removed in the first operation leaves the channel indicated by the numeral 41 at the opposite ends of the fruit while the channel 42 is severed through the movement of the fruit in the end portion of the guideway before discharge to the pitting mechanism, so that it is clear that a circumferential slice is removed from the fruit to permit the reception of the pitting knives. In Figure 8 the manner in which the cutting blades 28 and 33 operate to remove the slice is illustrated, showing how the severed portion is directed through the discharge openings by the beveled edges of these blades.

While the above description sets forth a slicing mechanism utilizing pairs of spaced parallel plate members for performing the slicing operation, it is to be understood that a tapered slicer structure may be used with similar results as shown in Figure 9. In a structure of this character a single blade 43 is adapted to replace the unit 20 and has a substantially narrow edge at 44 adjacent the entrance to the guideway, while the section thereof tapers toward the opposite end portion which is of a uniform thickness as indicated at 45. The cooperating unit 46 is constructed in the same manner with the end portion 47 tapering from the upper end toward the lower normally horizontal portion.

While the particular structure of these cooperating units has been shown of substantially L-shape configuration, it is to be understood that they may be formed in any manner for providing a guideway having different portions thereof arranged to provide movement of the fruit in one portion in angular relation to its movement in another portion, so that a circumferential slice will be removed from the fruit by feeding it through the entire guideway of the slicer mechanism. It is to be further understood that the slicer mechanism may be constructed to remove a slice having parallel side walls or may merely form a groove or channel in lieu of the slice having parallel side walls, which has been found sufficient to permit the entrance of the pitting knives for efficiently removing the pit from the two halves of the fruit adhering thereto.

What is claimed is:

1. A device of the class described comprising a support, stationary slicing means mounted on said support forming a guideway for the pit of a fruit, portions of said guideway directing the fruit in angular relation to other portions thereof, for forming a slice in a fruit moved through said guideway.

2. A device of the class described, comprising a support, cooperating slicing members mounted on said support and forming a guideway for the pit of a fruit, one of said members being yieldable relative to the other, said members forming a slice in the fruit in its movement through the guideway.

3. A device of the class described comprising a support, slicing means mounted on said support forming a guideway for receiving the pit of a fruit, and slice ejecting means associated with said slicing means to remove the slice as it is cut.

4. A device of the class described, comprising a support, slicing means mounted on said support forming a guideway for the pit of a fruit, slice-ejecting means associated with said slicing means to remove the slice as it is cut, and tip-removing means associated with said slicing means to remove the tip as the slice is cut.

5. A device of the class described, comprising a support, slicing means mounted on said support forming a guideway for the pit of a fruit, said means having yieldable portions to accommodate varying sizes of pits, and tip-removing and slice-ejecting means carried by said slicing means to simultaneously remove the tip and eject the slice.

6. A device of the class described, comprising stationary means forming a guideway for fruit with portions in angular relation to other portions for forming portions of an annular groove in fruit in each angular portion thereof.

7. A device of the class described, comprising a pair of spaced cutting elements forming an angular guideway for fruit, said elements being adapted to cut a circumferential slice in the fruit moved through said guideway.

8. A device of the class described, comprising a pair of spaced cutting elements forming a guideway for forming a circumferential slice in fruit, and means associated with said elements for removing said slice as it is cut.

9. A device of the class described, comprising a pair of spaced cutting elements forming a guideway having portions at relative angles for forming a circumferential slice in a fruit, and slice-removing means associated with said elements at each angular portion to remove the slice as it is cut.

10. A device of the class described, comprising a pair of cutting elements mounted in spaced relation and forming a guideway having angularly arranged portions for forming a circumferential slice in a fruit, and slice-removing means mounted between the elements in each angular portion to remove the slice as it is cut.

11. A device of the class described, comprising a pair of cutting elements mounted in spaced relation and forming a guideway having angularly arranged portions for forming a circumferential slice in a fruit, and slice-removing means mounted between the elements in each angular portion to remove the slice as it is cut, and discharge outlets in said elements for said slice.

12. Fruit pitting means comprising relatively stationary means provided with a guideway adapted to receive the pit of a fruit between the edges thereof, said guideway having sections in angular relation to each other so that as a fruit is forced through said stationary means the pulp thereof is divided.

13. The combination as set forth in claim 12, in which said sections of said guideway are at right angles to each other.

14. The combination as set forth in claim 12 in which said guide-way is shaped to wedge the divided sections of the pulp apart.

15. In a fruit pitter, the combination of a frame casting, an impaling member secured to the said casting comprising a fixed impaling blade rigidly secured to the said casting, a movable impaling blade pivotally secured to the said casting, means for yieldably urging the said movable impaling member towards the fixed impaling member, a curved pitting knife, and means for axially rotating the said pitting knife.

In testimony whereof I have signed my name to this specification.

ARTHUR L. DUNCAN.